April 8, 1958 J. P. ECKERT, JR., ET AL 2,830,198

CARRIER TYPE MAGNETIC AMPLIFIER WITH A FEEDBACK CIRCUIT

Filed April 7, 1955 2 Sheets-Sheet 1

INVENTORS
JOHN PRESPER ECKERT, JR.
THEODORE H. BONN

BY Charles C. English
AGENT

CARRIER TYPE MAGNETIC AMPLIFIER WITH A FEEDBACK CIRCUIT

Filed April 7, 1955 2 Sheets-Sheet 2

INVENTORS
JOHN PRESPER ECKERT, JR.
THEODORE H. BONN

BY Charles C. Englisch
AGENT 2,830,198
Patented Apr. 8, 1958

2,830,198

CARRIER TYPE MAGNETIC AMPLIFIER WITH A FEEDBACK CIRCUIT

John Presper Eckert, Jr., and Theodore H. Bonn, Philadelphia, Pa., assignors, by mesne assignments, to Sperry Rand Corporation, New York, N. Y., a corporation of Delaware Application April 7, 1955, Serial No. 499,823

18 Claims. (Cl. 307—88)

This invention relates to a carrier type magnetic amplifier with a feedback circuit. Feedback circuits have been proposed in combination with carrier type magnetic amplifiers for several purposes, the most customary one being to form a flip-flop circuit. For the purposes of this discussion the invention will be described in conjunction with a flip-flop circuit but it is understood that other applications are contemplated within the scope of the invention.

In a carrier type magnetic amplifier circuit with feedback, there is a large differential between the potential at which the circuit will be flipped from the first to the second stable state when the input potential is rising and the potential at which the circuit will flip back to the first stable state as the input is falling. One object of the invention is to provide a feedback circuit that reduces this differential.

Another object of the invention is to provide a feedback circuit in which the proper amount of feedback is always delivered to the input.

An additional object is to provide a feedback arrangement capable of producing a large feedback ratio when needed and which will reduce the feedback ratio to a small value when that amount of current is sufficient.

Other objects and advantages of the invention will appear as this description proceeds.

In carrying out the invention, the feedback circuit is arranged so that it feeds back a large percentage of the output current when the output is small and a smaller percentage of the output current when the latter is large. Regulating means is also provided to limit the feedback current so that the aforesaid differential potential (the difference between the potential required to flip from the first stable state to the second one as the potential is rising and the potential at which the circuit will flip back to the first stable state as the potential is falling) is small.

Figure 1:
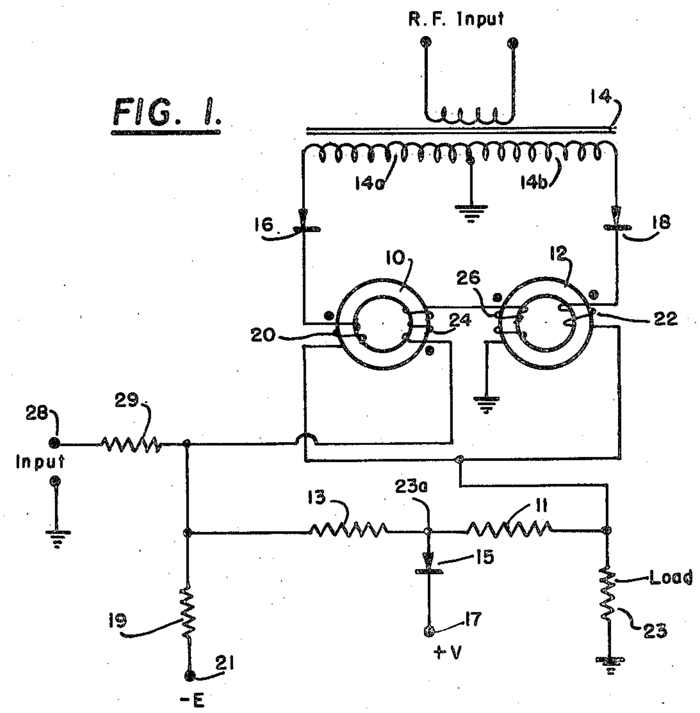
Figure 1 is a schematic diagram of one form of the invention.

In the drawings, the magnetic cores 10, 12 and 40 are preferably but not necessarily formed of a material exhibiting a substantially rectangular hysteresis loop. Such cores may be made from a variety of materials, among which are the various types of ferrites and the various kinds of magnetic tapes including Orthonik and 4–79 Moly-Permalloy. These materials may be heat treated to produce desired properties. The cores may be constructed in a number of geometric configurations including both closed and open paths. Cup-shaped cores, strips of material or toroidal cores may be used, but it is understood that the present invention is not limited to a specific core form or to a specific hysteresis loop configuration.

In Figure 1, power may be supplied to the amplifier through a high frequency power transformer 14, the primary winding of which is connected to a source of carrier potential and the secondary winding of which is coupled to the respective cores through a pair of rectifiers 16, 18. The high frequency power is hereinafter referred to as the "carrier" power for the reason that the frequency of it is high as compared to the frequency of the input signals and moreover the duration of an input control pulse is very long as compared to each cycle of the high frequency power. The center tap of the secondary winding of transformer 14 may be grounded as shown. Rectifiers 16 and 18 may be constituted of any of the conventional rectifiers, including semiconductor diodes and vacuum tubes.

Core 10 carries a power winding 20, one end of which is connected to rectifier 16 and the other end of which is connected to load 23. Core 12 carries a power winding 22 connected to rectifier 18 and to the load 23 in the same manner. One end of the load may be grounded as indicated to complete a pair of series circuits including, respectively, the halves of the power transformer secondary winding 14A and 14B, rectifiers 16 and 18, power windings 20 and 22, and the load 23.

Cores 10 and 12 also carry signal windings 24 and 26 which may be separate coils connected as illustrated, or one continuous coil wound on both cores. The signal windings are connected in series opposition and one end of coil 24 is connected through resistor 29 to a signal input terminal 28. The resistor 29 included in the input circuit may not be needed if the impedance of the input signal source is sufficient. Cores 10 and 12 may be biased from any suitable source of potential which may be connected into the input or output windings of the amplifiers or coupled to the cores with separate bias windings. Elements 19 and 21 illustrate one means of applying a bias. If the signal windings 24 and 26 were connected to the input 28 as shown, without any of the feedback means 11, 13, 15, 17, 19 and 21, the circuit would operate substantially as described in the copending application of Bonn and Spencer, Serial No. 468,468, filed November 12, 1954, entitled "Biased Carrier for Magnetic Amplifiers." As described in that application, in the absence of an input signal the output voltage of the amplifier will be a minimum. Assuming the absence of the aforesaid feedback means and also assuming that no signal is fed to the input 28, the operation is as follows. When the right end of the secondary of transformer 14 becomes positive, current will flow through rectifier 18, coil 22, to the load 23, inducing a potential in coil 26 which will cause current flow through coil 24 and revert the core 10 so that during the next half cycle when the left end of the secondary of transformer 14 becomes positive, the current flowing through rectifier 16 and coil 20 will find the core in a reverted condition and will drive the same positively along an unsaturated portion of the core, whereby the coil 20 has high impedance and there will be only a small flow of current to the load. Since the core 10 is being driven along an unsaturated portion thereof, large potential will be induced in coil 24 which will cause flow of current through coil 26 and revert the core 12 to negative remanence so that on the next half cycle (the right-hand end of secondary 14B being positive) the positive pulse flowing through rectifier 18 and coil 22 will drive the core 12 along an unsaturated portion thereof, thereby inducing potential in winding 26 which flows through coil 24 and reverts the core 10. Coil 22 has high impedance to the aforesaid flow of current therethrough hence the current to load 23 is small. Potential induced in one of coils 24 or 26 may effect a current flow in the other through the input circuit which is assumed to have sufficiently low resistance to enable that result to occur. Hence, as long as there is no signal at the input, the coils 20 and 22 will have high impedance and there will be substantially no current at the load 23. If, however, there is a signal at the input 28 it will prevent the flow of current in the coils 24 and 26 due to induction of potential in coils 24 and 26, and both cores 10 and 12 will be driven to saturation by the positive pulses flowing through coils 20 and 22, whereby coils 20 and 22 will have low impedance and the currents will readily flow therethrough to the load 23.

Figure 2:
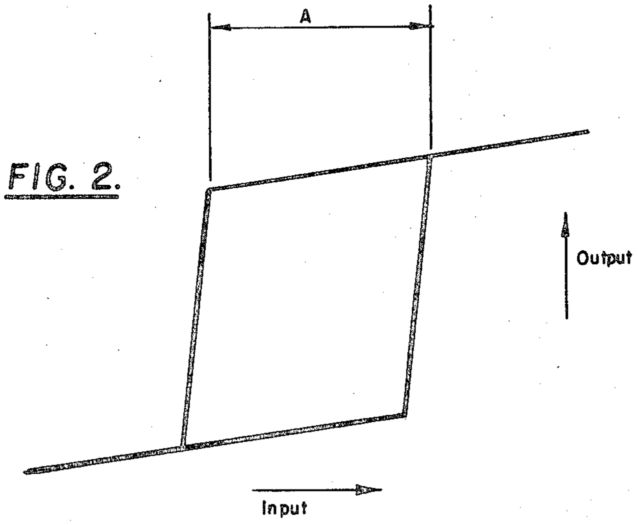
Figure 2 is a curve showing the flipping time of the apparatus.

In the circuit of Figure 1, as the potential of the input signal increases from a low value, the device will be in its first stable state in which both cores have high impedance and there is little output at the load. Upon reaching a given potential, the device flips to its other stable state in which there is a large output at the load. If then the input potential falls, it must fall below the potential which was required to flip the device to the second stable state, if the apparatus is to return to its first stable state. This differential is represented in Figure 2 by a potential differential A. As stated above, it is one of the objects of the invention to reduce the differential A. This is accomplished by adding the feedback circuit including resistors 11 and 13, and the limiter 15, 17. Let us assume that an input is applied at 28. Concurrent with the increase of the input signal, the output potential increases. As the potential at the upper end of the load begins to rise, resistors 11 and 13 form a direct path for the flow of feedback current to the input 28; and the limiter 15, 17 is inactive inasmuch as the output potential has not as yet risen to the value +V. However, as the output potential at load 23 builds up due to direct and feedback input, it ultimately reaches a point where the wire 23A reaches the positive potential value +V. At this point, the limiter including rectifier 15 and the positive source 17 prevents further rise in potential of wire 23 and consequently from that time on the feedback remains relatively constant. As a consequence the output remains substantially constant. It should be noted that the values of resistors 11, 13 and 19 are preferably, but not necessarily, so selected that for values of output potential less than +V, the loop gain is greater than unity. Due to the fact that the amount of feedback is limited, there is an accurate control of the feedback current and consequently the flipping differential is less than it would be without the limiter 15, 17. Inasmuch as there may be a small potential across load 23 in the idle position and since it is desired to insure that the cores 10, 12 are reverted to negative remanence when the device is in the idle position, bias is applied by means of a resistance element 19 connected to a negative source 21.

If it is desired to operate the device as a flip-flop circuit, the input 28 may constitute the "set" input and the feedback may be made sufficient that once the device is flipped to its second stable state (maximum output at load 23) the feedback current will be regulated (by limiter 15, 17) to be just sufficient to hold the device in its second stable state. The source 17 may then constitute a "reset" input and the device may be reset by applying a negative potential at 17 rather than the usual positive potential. In the alternative a negative potential may be applied anywhere along the feedback path, but preferably at point 28, in order to flip the apparatus back to its first stable state.

Figure 3:
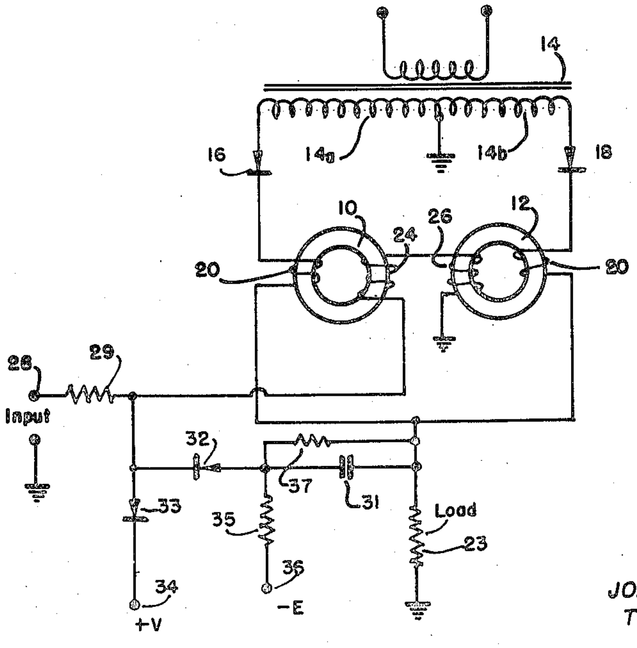
Figure 3 is a schematic diagram of a modified form of the invention.

Figure 3 is a circuit diagram of a modified form of the invention in which the parts which have reference numerals corresponding to those of Figure 1 are the same and operate in the same way as the similar parts of Figure 1. The only difference between Figures 1 and 3 is in the feedback circuit. In Figure 3 feedback is accomplished through a condenser 31 in parallel with resistor 37, and a rectifier 32. When the device is in the minimum output, or idle, state, the condenser 31 is not charged and consequently a heavy current may flow therethrough back to the input. However, as the operation continues, the condenser 31 becomes charged more and more as the voltage at the upper end of the load 23 increases, and consequently a smaller percentage of the output is shunted through the feedback path. The feedback potential may be limited in amount by the limiter comprising rectifier 33 and positive source 34 for the purpose of reducing the differential A of Figure 2. The resistor 35 has high resistance and is connected to negative source 36 which has a small potential sufficient to cut off rectifier 32 and prevent current flow through that rectifier except during intervals when the upper end of the load 23 has a positive potential thereon sufficient to overcome the effect of source 36 and to raise the anode of rectifier 32 to a positive value.

In case it is desired to make a flip-flop out of the circuit, the input 28 may constitute the "set" input and the terminal 34 may be the "reset" input. In order to reset the device a negative potential may be applied to terminal 34. Alternatively, a negative potential may be applied to input 28. When a reset input signal is applied, the decrease in potential across load 23 is transferred to the anode of rectifier 32 by capacitor 31, thus cutting off rectifier 32. This removes all feedback. As a result, the transition time is reduced in addition to the reduction of the differential A mentioned above.

Figure 4:
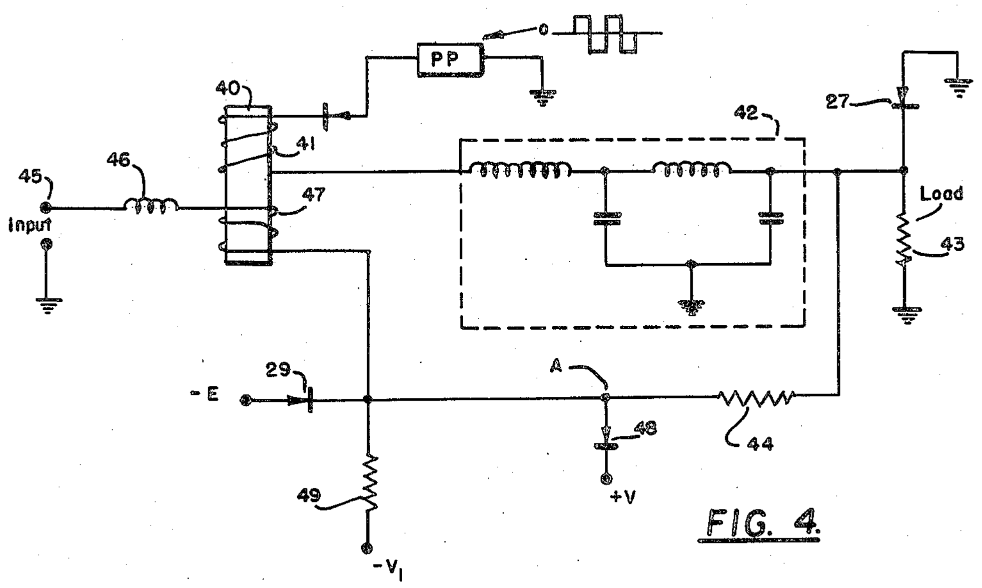
Figure 4 is a schematic diagram of another modified form of the invention.

Figure 4 is a modified form of the invention as applied to the single ended carrier type of amplifier. This type of amplifier is clearly described in the prior copending application, Serial No. 446,095, filed July 27, 1954, now U. S. Patent No. 2,798,168 entitled "Magnetic Amplifier and Flip-Flop Circuit Embodying the Same." In order to provide background information, a preliminary discussion of the circuit of Figure 4 will be given assuming the feedback means, herein claimed, is omitted and that the lower end of coil 47 is grounded. The source PP preferably, but not necessarily, generates a square wave alternating current of high frequency compared to the frequency of the input pulses. Moreover, each input pulse is of very long duration as compared to the duration of each cycle of the source PP. If there is no input at 45, the currents flowing from the source PP through power winding 41 will drive the core 40 to saturation so that coil 41 has low impedance and the pulses will readily flow therethrough to the smoothing filter 42 which converts the pulses into a smooth direct current and feeds the latter to the load 43. The limiter 27 may be employed to insure that the upper end of the load 43 never goes negative. The apparatus will continue in this state until a positive signal is received at the input 45. Such a signal will flow through the inductor or input filter 46 to the input coil 47. Such a signal will revert the core 40 during the spaces between positive excursions of source PP and hence during positive halves of the cycle of that source the core will be driven positively along an unsaturated portion of the hysteresis loop and during the spaces between positive excursions of source PP the core will be driven negatively along unsaturated portions of the hysteresis loop by the current flowing in coil 47. As a result, the core is always operating along unsaturated portions of its hysteresis loop and coil 41 has high impedance so that the current fed to the output is very small. Our aforesaid prior copending application also teaches that there may be feedback from the output filter 42 to the input coil 47. However, the novelty in the present application relates to an improved feedback circuit. The output of filter 42 is connected through resistor 44 to the lower end of coil 47. The potential of point A is controlled by the feedback current, as well as by a plurality of electrical sources which are connected to point A. Point A is connected to a source +V (V volts above ground) through a rectifier 48. It is also connected to a source −E (E volts below ground) through rectifier 29. It is further connected to a source $-V_1$ (a potential more negative than E volts below ground) through resistor 49.

The device of Figure 4 is shown as a flip-flop circuit employing a complementing amplifier. When there is a positive input at 45 which exceeds +V volts, current flow in coil 47 reverts core 40, and the output drops to a negligible value. Hence current flows in the path −E, 29, 49, $-V_1$, and point A is at −E volts. If now the input at 45 should drop to zero, current will flow in the path 45, 46, 47, 49 to $-V_1$, remembering that the input is some form of signal generating device that allows current to flow through it even when there is zero potential across it. Hence the core will remain reverted and the output will remain small. If now an input signal more negative than −E volts is applied to input 45, current flow in coil 47 will cease, and, hence, the output will increase, and point A will rise to +V volts, reversing the current flow in coil 47. Thus the output will remain high even though the input returns to zero volts.

It follows from the foregoing that when the output of the device is large, the current in input coil 47 is large and in such direction as to maintain the output, whereas when the output current in load 43 is small, the current flow in coil 47 is large in the reverse direction, and tends to maintain the small output. This results in decisive operation of the device and abrupt flipping thereof in response to flipping signals.

In Figure 4, it is understood that the flow of high frequency pulses through coil 41 may induce potentials in coil 47 which will tend to cause flow of current through the input circuit unless steps are taken to block the flow of current due to these induced potentials. Accordingly, input filter 46 is inserted in series with the input coils. This filter may be in the form of a simple inductor or may be any of the numerous complicated filter networks well known in the art which are adapted to allow the flow of low frequency currents therethrough but which block the flow of high frequency currents therethrough. These circuits allow the very low frequency input signals to readily flow therethrough to the input coils but block the high frequency currents which appear at the frequency of the power pulses .

We claim to have invented:

1. In a carrier type magnetic amplifier having a transfer characteristic requiring an elongated period to pass from the state of low output to the state of full output, a saturable core, power means for generating a train of carrier pulses, a load, first winding means connected between said power means and said load for providing a path for said pulses to flow to said load, whereby the amplitude of the pulses varies inversely according to the impedance of the winding means, second winding means for controlling the reversion of the said core thereby to control the impedance of the said first winding means, and voltage feedback means between said first and second winding means for reducing the transfer time required to shift the amplifier from the state of low to the state of full output potential, said feedback means including voltage limiting means operative at a potential greater than that representative of said low output potential from said amplifier whereby the ratio of feedback potential to output potential decreases as said amplifier output rises to full output potential.

2. In a magnetic amplifier, a saturable core, input and output winding means on said core, a load connected to said output winding means, means for passing a train of spaced power pulses through at least a part of said output winding means to said load, and feedback means connecting said load to said input winding means, said feedback means including a limiter for limiting the potential thereof whereby the ratio of feedback potential to output potential varies with variations in the amplifier output potential across said load.

3. In a magnetic amplifier, a saturable core, first and second winding means on the said core, means for passing a train of spaced power pulses through at least a part of said first winding means to an output, control means coupled to said second winding means for controlling the impedance of said first winding means, and feedback means connecting said output to said second winding means, said feedback means having a nonlinear characteristic and including means for varying the percentage of output potential which is fed back from said output to said second winding means whereby said feedback means exercises a greater control effect per unit of output potential when said output potential is low than it does when said output potential is high.

4. In a magnetic amplifier, a saturable core, a power winding on the core having an output, means for passing spaced pulses through said power winding to said output, a control winding on said core, and feedback means connected between said output and said control winding, said feedback means including voltage limiting means for changing the percentage of output potential fed back to said control winding when said amplifier changes from low output to high output whereby said feedback means exercises a greater effect per unit of output potential when said output potential is low than it does when the said output potential is high.

5. In a carrier type magnetic amplifier having a transfer characteristic requiring an elongated period to pass from a state of no output to a state of full output, a saturable core, a power winding on said core having an output, a power source for feeding pulses through said power winding to said output, a control winding on said core, feedback means between said output and said control winding for reducing the transfer time of said amplifier, said feedback means including means for varying the percentage of output potential fed back to said control winding whereby the relative effect of said feedback upon said control winding per unit of output potential decreases as the said output potential increases, and signal means coupled to said control winding for controlling the impedance of said power winding thereby to enable the said amplifier to pass from a state of low output potential to full output potential over the period of a substantial number of pulses of said power source.

6. In a carrier type of magnetic amplifier having a transfer characteristic requiring an elongated period to pass from a state of low output to a state of full output, a core of magnetic material, an input winding on the said core, a power winding on the said core having an output, means for feeding spaced pulses through said power winding to said output, and means coupled to said input winding for controlling the reversion of the said core thereby to transfer the amplifier from the said state of low output to a state of full output, the last-named means including an input signal source and also including voltage feedback means connected between said output and said input winding for increasing the effect of an input signal from said source during the transfer period of the amplifier, and means limiting the magnitude of feedback voltage after the said amplifier has been transferred to its state of full output.

7. In a magnetic amplifier, a saturable core, winding means on the said core, means for feeding spaced power pulses through at least a portion of the said winding means to an output, signal means coupled to a control winding portion of said winding means for selectively varying the potential appearing at said output, and voltage feedback means between said output and said control winding portion for reducing the transfer time required to shift the said amplifier from a state of low to a state of full output voltage, said feedback means including means for varying the ratio of feedback voltage to output voltage as said amplifier shifts from one to the other of said output states.

8. In a carrier type of magnetic amplifier, a saturable core, a power winding on the core, an input winding on the core, means selectively coupling control signals to said input winding, means for feeding a train of spaced power pulses through the power winding, said power pulses having a repetition rate substantially higher than that of said control signals whereby said amplifier requires a period equal to at least the duration of several of said power pulses to transfer from low to full output potential, and feedback means connected between said power winding and said input winding for reducing the transfer time of the amplifier from one to the other of said output potential states, the feedback means including limiter means operative at a feedback potential larger than that representative of said low output from said amplifier for limiting the magnitude of the feedback potential.

9. A carrier type of magnetic amplifier as defined in claim 8 in which the amplifier is of the push-pull type, said feedback means including a direct current circuit between the output of the said power winding and the said input winding, said direct current circuit having a resistor in series therewith.

10. A carrier type of magnetic amplifier as defined in claim 8 in which the feedback means includes a series circuit between the output of the power winding and said input winding, said series circuit including a condenser and a rectifier, said rectifier preventing flow of input current to the output, the limiter means limiting the potential at said input winding.

11. A carrier type of magnetic amplifier as defined in claim 10 in which the amplifier is of the push-pull type.

12. A carrier type of magnetic amplifier as defined in claim 8 in which the said feedback means is connected to one end of the input winding, the other end of the input winding constituting a signal input, said limiter means limiting the rise in potential in the direction that the potential rises when the amplifier transfers from low to full output, means having poor voltage regulation for biasing the feedback means with potential having polarity opposite to the feedback potential, and limiter means for limiting the extent that the potential of the feedback means may move in said opposite direction.

13. In a bistable device, a saturable core, winding means on the core having a set input and an output, means for passing a train of spaced power pulses through at least a part of said winding means to said output, and feedback means connecting said output to said input, said feedback means including a limiter for limiting the feedback potential thereof and also including reset input means whereby the potential of the feedback means may be altered to reset the device.

14. In a bistable device, a saturable core, a power winding on the core, an input winding on the core, means for feeding a train of spaced power pulses through the power winding, feedback means connected between said power winding and said input winding to reduce the transfer time of the amplifier and to hold the device in the stable state in which there is full output, the said feedback means including limiter means to limit the magnitude of feedback potential, and input means applying setting saignals to the said input winding to enable the device to be flipped into the stable state of full output where it will remain until reset, said input means also including means for applying resetting signals to the input winding so the device will remain in the stable state of low output until a setting signal is again received.

15. A magnetic amplifier having an input and an output, means selectively coupling control signals to said input for selectively changing the potential at said amplifier output, potential feedback means between said output and said input, and potential limiting means coupled to said feedback means for limiting the maximum potential fed back from said amplifier output to said amplifier input whereby a smaller percentage of said amplifier output is fed back to said input when said amplifier is at a high potential output state than when said amplifier is at a low potential output state.

16. A magnetic amplifier having an input and an output, means selectively coupling control signals to said input for selectively increasing the potential at said amplifier output, a feedback network connected between said output and said input, a rectifier having one of its electrodes coupled to said feedback network, and a source of control potential coupled to the other terminal of said rectifier for controlling the conductivity of said rectifier, whereby the magnitude of said feedback potential is limited by the magnitude of said control potential.

17. An amplifier having an input and an output, means for selectively applying control signals to said input thereby to vary the magnitude of potential at said output between a low output potential state and a full output potential state, voltage feedback means between said output and said input, and means coupled to said feedback means for varying the ratio of voltage feedback to output potential when said amplifier output is changed from one to the other of its output potential states.

18. An amplifier having an input and an output, means for selectively applying control signals to said input thereby to vary the magnitude of potential at said output between a low output potential state and a full output potential state, voltage feedback means between said output and said input, and means coupled to said feedback means for varying the ratio of voltage feedback to output potential when said amplifier output is changed from one to the other of its output potential states, said last named means compising a rectifier coupled to said feedback means, and a source of control potential coupled to said rectifier for determining the maximum potential of said voltage feedback.

References Cited in the file of this patent

UNITED STATES PATENTS

| | | |
|---|---|---|
| 2,709,798 | Steagall | May 31, 1955 |
| 2,710,952 | Steagall | June 14, 1955 |
| 2,713,674 | Schmitt | July 19, 1955 |

OTHER REFERENCES

D. G. Scorgie: "Fast Response with Magnetic Amplifiers," N. R. L. Publication July 29, 1953 (111212 N. R. L. Report 4205).

R. A. Ramey: "Magnetic Amplifier Circuits and Applications," "Electrical Engineering," September 1953 (pp. 791–795).